United States Patent
Maury

[15] 3,695,318

[45] Oct. 3, 1972

[54] COMPOUND MITERING DEVICE

[72] Inventor: Lawson D. Maury, 510 Colonial Rd., Memphis, Tenn. 38117

[22] Filed: Oct. 21, 1970

[21] Appl. No.: 82,740

[52] U.S. Cl. ....................144/35, 33/180 R, 143/6 R, 143/87, 269/43, 269/45, 269/87.3, 408/72

[51] Int. Cl. ...........................B27b 27/06, B25b 5/14

[58] Field of Search.............143/86 R, 86 A, 87, 6 R; 145/129; 269/40, 43, 45, 87.3, 9; 144/35, 3 R; 408/72; 33/180 R

[56] References Cited

UNITED STATES PATENTS

| | | | |
|---|---|---|---|
| 2,917,089 | 12/1959 | Ennis | 143/6 R X |
| 3,103,352 | 9/1963 | Steffen | 269/45 |
| 3,397,722 | 8/1968 | Long | 143/86 |
| 960,159 | 5/1910 | Dipworth | 143/86 |
| 2,776,683 | 1/1957 | Cowley | 269/43 X |
| 2,798,520 | 7/1957 | Maskulka et al | 408/72 X |
| 2,740,308 | 4/1956 | Blanchard | 408/72 |

*Primary Examiner*—Andrew R. Juhasz
*Assistant Examiner*—James F. Coan
*Attorney*—John R. Walker, III

[57] ABSTRACT

A device for precision mitering or cutting linear framing material to specified lengths suitable for framing different size openings, e.g., a painting having a length of 40 inches and a width of 20 inches. The device includes structure for facilitating compound mitering or more specifically for properly aligning and holding while severing the generally recognized standard framing material, i.e., the painting being framed is supported close to the wall with the major plane of the frame being directed outwardly from the wall and/or the surface of the painting, and the less popular or reverse framing material, i.e., the painting being framed is usually supported a greater distance from the wall with the major plane of the frame being directed inwardly toward the wall from the surface of the painting. The holding structure clampingly holds two pieces of framing material simultaneously so that the one end of opposite sides of the frame, e.g., the two 40 inch pieces may be simultaneously mitered with one pass of the severing means and the other end of the two 40 inch sides may be mitered with a second pass of the severing means then the two 20 inch sides are likewise mitered resulting in precision fitted joints at the corners of the frame. The device also includes drill guide structure for accurately guiding a drill while a dowel pin hole is drilled into the severed butt end of the pieces of framing material. The accurately placed dowel pin greatly simplifies the task of rigidly joining the adjacent sides to a precision fit.

9 Claims, 13 Drawing Figures

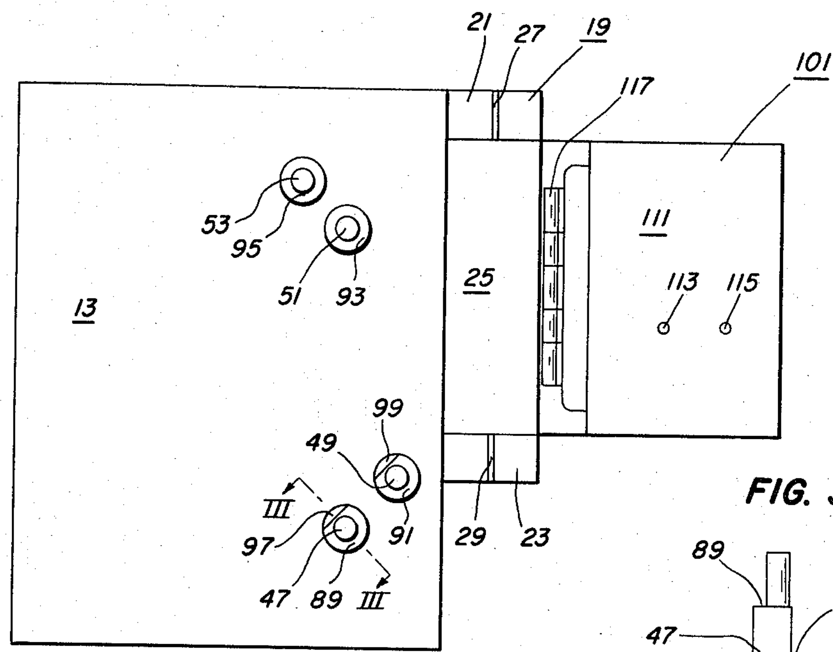
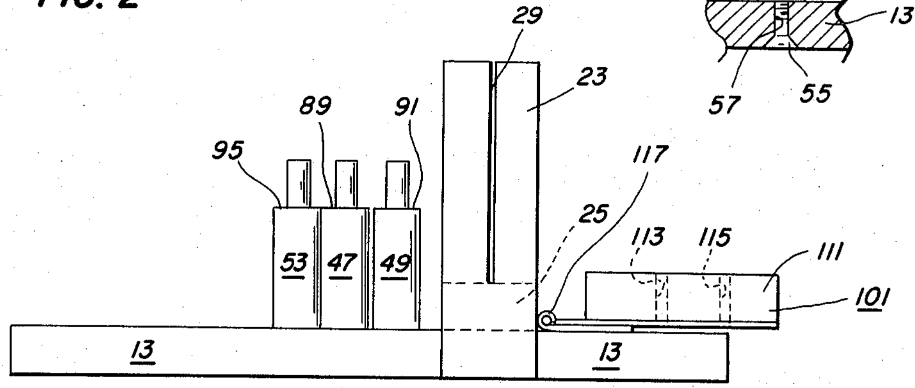
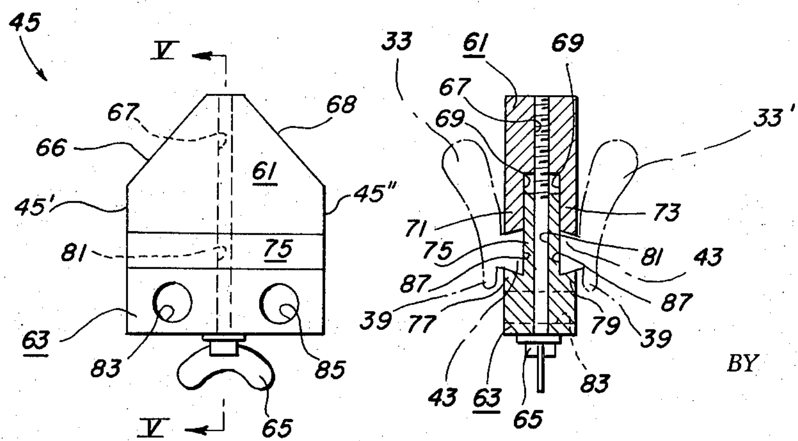
INVENTOR.
LAWSON D. MAURY
BY John R. Walker, III
Attorney

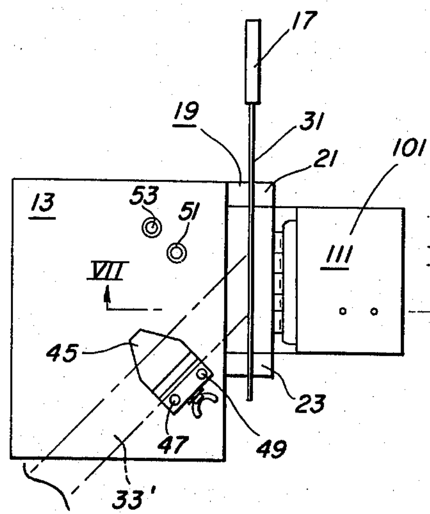
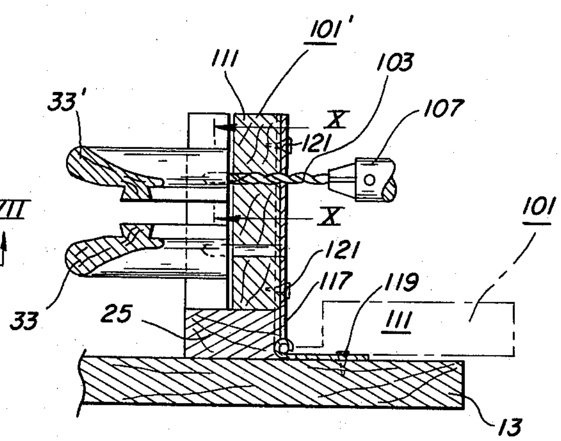
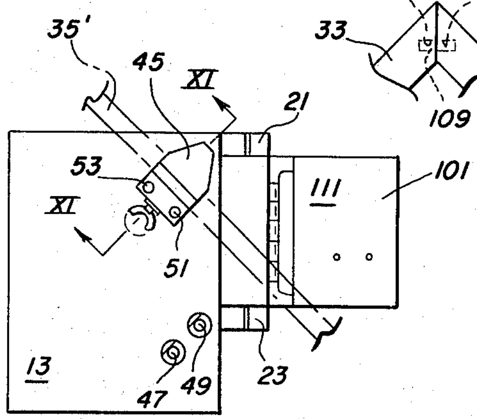
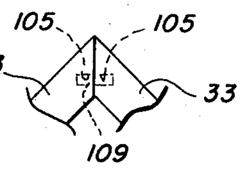
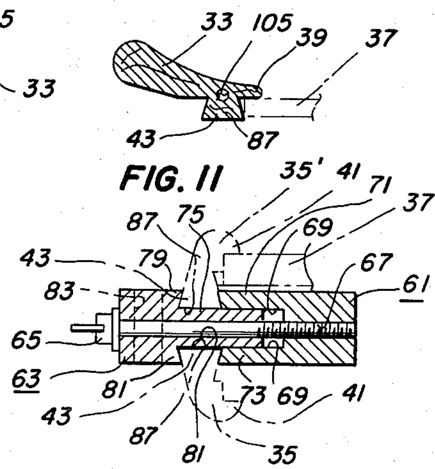
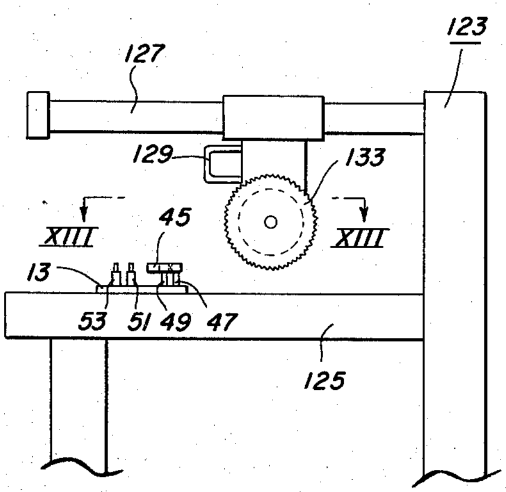
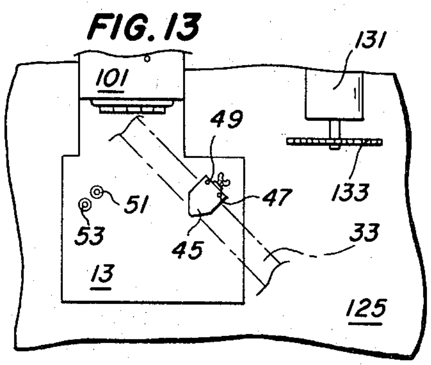
INVENTOR.
LAWSON D. MAURY
BY John R. Walker, III
Attorney

COMPOUND MITERING DEVICE

BACKGROUND OF THE INVENTION

1. Field of the Invention

This invention relates to mitering devices in general and more particularly to a compound mitering device.

2. Description of the Prior Art

The prior art known by the applicant consists of: the Wagoner U.S. Pat. No. 451,089; the Drinkaus U.S. Pat. No. 687,209; the Peterson U.S. Pat. No. 976,097; and the Pearce U.S. Pat. No. 2,220,794. All of the above patents pertain to a device for performing a simple miter cutting of framing materials and the like, i. e., the reverse surface of the frame material lying flat or contiguously engaging the table surface of the miter cutting device. However, the scarcity of lumber and/or the cost thereof has provoked a different and more economical technique in framing material, particularly frames for paintings and the like. This technique utilizes a relatively thin piece of lumber which is made to appear thicker by milling a framing material having the appearance of other framing material which heretofore was milled from thicker lumber. This type of framing material does not lie flat against the wall when built into a painting frame, i. e., the painting is supported close to the wall with the major plane of the frame being directed outwardly from the wall and/or the surface of the painting.

A less popular technique which also utilizes a relatively thin piece of framing material to achieve the same effect but in a reverse manner, i.e., the painting is supported a greater distance from the wall with the major plane of the frame being directed inwardly toward the wall from the surface of the painting. This technique presents a problem when holding the frame material in a conventional miter cutting machine since the framing material cannot lie flat when being cut and since the angular relationship between the major plane of the frame material and the table surface of the cutting machine must be precisely constant or equal for each of the four pieces or sides used in framing the painting or the like.

Framing material of this type usually has a base portion having a relatively small alignment surface which is intended to be parallel with the surface of the wall when formed into a frame. Accordingly, clamping devices for holding the framing material in the simple or conventional mitering devices are known by the applicant, i. e., a holding device for contiguously engaging the alignment surface of the base portion with the table surface of the mitering device. These holding devices include structure that engages the obverse surface of the framing material which conceivably mars the surface of the framing material. This is particularly objectionable when using prefinished framing material.

Additionally, since the alignment surface of the base portion of the framing material is very small and since the framing material usually consists of a soft wood, proper holding pressure is not achieved resulting in slight shifting of the framing material, causing a poor fit at the corner of the frame.

Further, fancy picture framing material is difficult to position in the conventional mitering device, i. e., to tilt the framing material laterally and at the same time maintain the optimum 45° angle with the longitudinal axis thereof, this results in non-contiguous joining of the adjacent framing members. Obviously, much time and material is wasted in attempting to fabricate first quality frames.

Further, in order for a frame to have precision fitting of the adjacent members at the four corners thereof, it is essential that opposite members have precisely equal length, a prerequisite rarely achieved with existing mitering devices. Accordingly, a critical eye can easily detect mal-alignment of adjacent members at the corners of the completed frame.

SUMMARY OF THE INVENTION

The present invention is directed towards overcoming the disadvantages and problems relative to previous mitering devices, particularly the problem in compound mitering of framing material used in fabricating a frame for a painting or the like. Perhaps the most important feature of a mitering device is its ability to hold the workpiece rigid while making the mitered cut. This problem was solved long ago for the simple miter cutting, however, a completely different problem is presented when the plane of the workpiece is tilted away from the table surface of the mitering device or compound mitering is attempted. However, the present invention overcomes this problem as will be more apparent in the description to follow.

A concept of the present invention is to: First, improve the shape of the base portion of the framing material, i. e., in cross section the base portion is void of the usual sides in respect to the alignment surface. The base portion of my improved framing material has a dove-tailed shape for compatible utilization with the present compound mitering device. In other words, the present invention is not compatible with existing framing material but rather depends upon the framing fabricator milling a framing material having a newly designed base portion. It should be understood that this newly designed base portion will not alter the appearance of the existing framing material since the base portion is on the reverse side thereof and is intended to contiguously engage the vertical wall when formed into a picture frame or the like.

Secondly, the device includes structure for properly aligning and holding the framing material adjacent any well known planar severing means, e. g., a radial arm power saw, a chopping power saw, and/or a simple handsaw. Obviously, a fixed and predetermined relationship between the severing means and the holding structure is included.

Thirdly, the device includes means for quickly mounting the holding structure so that the generally recognized standard framing material and the less popular or reverse framing material may selectively be mounted for precision compound mitering. It should be understood that the term "standard framing material" pertains to framing for a painting that is supported close to the wall with the major plane of the frame being directed outwardly from the wall and/or the surface of the painting and that the term "reverse framing material" pertains to the framing for a painting which is usually supported a greater distance from the wall with the major plane of the frame being directed inwardly toward the wall from the surface of the painting. Obviously, both the standard and the reversed framing material preferably has the improved base portion, i. e., a dove-tail cross section as above described.

Fourthly, the device includes structure for holding two pieces of framing material simultaneously so that the one end of the two pieces, preferably opposite sides of the frame, may be compound mitered with one pass of the severing means and the other end of the two pieces may be compound mitered with a second pass of the severing means. This feature greatly enhances the precision fitting of the adjacent pieces at the corners of the frame since even the slightest difference in length between opposite sides presents a conspicuously mal-fitted joint at the corners of the frame.

Fifthly, the device includes drill guide structure for accurately guiding a drill while a dowel pin hole is drilled into the severed butt ends of the pieces of framing material. This feature greatly facilitates perpendicularly joining of the adjacent members, aiding in the precision fitting of the joints at the corners of the frame. Holding of a frame of the type requiring compound mitering while joining the adjacent members in a conventional manner, i. e., nails or the like, is a difficult task and usually result in the members not being perfectly aligned. Additionally, dowel pin holes which are the slightest degree out of proper alignment are an aggravation in joining the adjacent members.

In other words, the secret in fabricating a first quality frame is in precision alignment and holding of the framing material with respect to the working tools. The device of the present invention accomplishes this task inexpensively and the user need not have extensive training. Thus providing the "do-it-yourself" or commercial framer with a means for fabricating, within his facility, a frame of first class quality. In addition, as will be more apparent in the description to follow later in the specification, the present invention makes the measurement of the framing material much easier than was heretofore possible.

DESCRIPTION OF THE DRAWINGS

FIG. 1 is a plan view of the compound mitering device of the present invention, the workpiece holding structure for clampingly holding the framing material being removed.

FIG. 2 is a side elevational view of the compound mitering device of the present invention, as presented in FIG. 1.

FIG. 3 is a partially sectionalized view taken as on the line III—III of FIG. 1.

FIG. 4 is a plan view of the workpiece holding structure.

FIG. 5 is a sectional view taken as on the line V—V of FIG. 4.

FIG. 6 is a plan view similar to FIG. 1 showing the workpiece holding structure in the first of two positions, with a handsaw, and a piece of standard framing material being shown in phantom.

FIG. 7 is a sectional view taken as on the line VII—VII of FIG. 6.

FIG. 8 is a plan view similar to FIG. 6 showing the workpiece holding structure in the second of two positions, with a piece of reverse framing material being shown in phantom.

FIG. 9 is a partial view of a frame showing the relationship of the dowel pin hole with respect to the adjacent framing members.

FIG. 10 is a sectional view taken as on the line X--X of FIG. 7, showing the arrangement of the dowel pin hole with respect to the butt end of the standard framing material and also showing a painting in phantom to better illustrate the relationship between standard frame material and a painting or the like.

FIG. 11 is a sectional view taken as on the line XI—XI of FIG. 8, showing a cross section of reverse framing material and a painting in phantom.

FIG. 12 is a side elevational view of the compound mitering device of the present invention in combination with a radial arm saw.

FIG. 13 is a sectional view taken as on the line XIII—XIII of FIG. 12.

DESCRIPTION OF THE PREFERRED EMBODIMENTS

The compound mitering device 11 of the present invention includes a horizontal platform 13, a planar severing means, e. g., a hand saw 17 (FIG. 6) or the like, guide means 19 fixedly attached to the platform 13 to guidingly constrain the plane of the saw 17 substantially perpendicular to the plane of the platform 13. The platform 13, preferably being formed from plastic, wood, metal or the like and having a shape substantially as depicted in FIGS. 1 and 2, supports the lower end of the guide means 19. The guide means 19, substantially comprising a pair of identical upstanding members 21, 23, preferably being formed from plastic, wood, metal or the like and having a shape substantially as depicted in FIGS. 1 and 2, is fixedly attached to the platform 13 in any well known manner, e. g., wood screws (not shown) inserted through suitable apertures (not shown) therein and threadedly engaging the platform 13.

The guide means 19 preferably includes a horizontal blocklike member 25, preferably formed from plastic, wood, metal or the like. The members 21, 23 straddle the member 25 and are respectively provided with suitably aligned vertically disposed slits 27, 29, for receiving the planar blade 31 of the saw 17. The horizontal member 25, being fixedly attached to the platform 13 in any well known manner, e. g., woodscrews (not shown) extending through suitable apertures (not shown) which threadedly engage the platform 13, functions as a mechanical stop for the blade 31 obviating the slits 27, 29 from becoming longer than desired from the blade 31 repeatedly passing therethrough and for other reasons yet to be disclosed. However, it should be pointed out that member 25 may be omitted without departing from the spirit and scope of the present invention, in which case the butt ends of the framing material 33, 35 will act as a stop for the guide means 101.

The device 11 of the present invention is particularly directed toward compound mitering the ends of standard framing material 33, as best viewed in FIG. 10, and/or reverse framing material 35, being phantomized in FIG. 11. It should be appreciated that the framing material 33, 35, as depicted in the drawings, is conveniently an oversimplification of the usual rather elaborate framing material. Additionally, the framing material 33, 35 is intended to include the unfinished and the well known prefinished framing material. The framing material 33, 35 is shown in FIGS. 10 and 11 with respect to a phantomized painting 37, i. e., the framing material 33, 35 respectively having lip portions 39, 41 which extend a short distance over the margins of the canvas or the painted surface of the painting 37.

Framing material 33, 35, which is compatible with the compound mitering device 11 of the present invention must include a unique dove-tailed base portion 43, for reasons, yet to be disclosed. The dove-tailed base portion 43 extends along the length of the reverse side of the framing material 33, 35 and is preferably milled therein at the time of fabricating the framing material 33, 35.

The device 11 also includes a workpiece holding component 45 for clampingly holding the dove-tailed base portion 43 of the framing material 33, 35, a first set of mounting posts 47, 49, and a second set of mounting posts 51, 53. The mounting posts 47, 49, 51, 53, preferably being formed from machine steel or the like having a shape substantially as depicted in FIGS. 1, 2 and 3, are fixedly attached to the platform 13 in any well known manner, e. g., like that shown for the post 47 (FIG. 3) wherein a flat head machine bolt 55 is shown extending through an aperture 57 in the platform 13 and is threadedly received longitudinally by a threaded aperture 59 in the post 47.

Referring now to FIGS. 4 and 5 of the drawings wherein it may be seen that the workpiece holding component 45 includes a first member 61 and a second member 63 which are slidably attached one to the other by a wing bolt 65. The first member 61, formed from machine steel or the like, preferably has two tapered sides 66, 68, directed inwardly and upwardly from the base portion thereof, substantially as viewed in FIG. 4. Additionally, the member 61 is provided with a threaded aperture 67 which extends from the base upwardly through the upper surface thereof. Further, extending along the base portion of the member 61 is a groove 69 which forms a pair of jaws 71, 73, the jaws 71, 73 terminating at ends tapered inwardly toward the groove 69 so as to collectively form a complementary shape for contiguous engagement with one side of the dove-tailed base portion 43 of the framing material 33 and/or 35, as best viewed in FIGS. 5 and 11.

The second member 63, being formed from a rectangular piece of machine steel or the like, has a cross sectional shape resembling an inverted T, substantially as viewed in FIG. 5, i. e., the base of the "T" forming a tongue portion 75 and the cross bar thereof forming a pair of jaws 77, 79. The jaws 77, 79 taper inwardly so as to have a complementary shape for contiguous engagement with the other side of the dove-tailed base portion 43 of the framing material 33 and/or 35. The member 63 is provided with an aperture 81 for slidably receiving the wing bolt 65 and a pair of parallel spaced apart apertures 83, 85, being drilled perpendicular to and on either side of the aperture 81, as best viewed in FIG. 4.

The groove 69 slidably receives the close fitted tongue 75. The bolt 65 is inserted through the aperture 81 and is threadedly received by the aperture 67. The dove-tailed base portion 43 of the framing material 33, 35 includes an alignment surface 87 for properly aligning the framing material with the device 11. The workpiece holding component 45, as just described, is intended for firmly holding two pieces of framing material 33, 33' or 35, 35' simultaneously in a manner as best viewed in FIGS. 5 and 11, i. e., the two pieces of framing material 33, 33' or 35, 35' are placed back to back with the alignment surfaces 87 thereof contiguously engaging the tongue portion 75 of the member 63. Referring now to FIG. 5, tightening the wing bolt 65 slidably draws the two members 61, 63 together so that the respective jaws 71, 77; 73, 79 contiguously engage the sides of the dove-tailed base portions 43 so as to firmly hold the framing material 33, 33' for miter cutting. Obviously, framing material 35, 35' (FIG. 11) is firmly held in like manner as just described for framing material 33, 33'.

The first set of mounting posts 47, 49 support the workpiece holding component 45 for compound miter cutting of the standard framing material 33, 33' and the second set of mounting posts 51, 53 support the holding component 45 for compound miter cutting of the reverse framing material 35, 35'.

The uppermost ends of the mounting posts 47, 49, 51, 53 are concentrically reduced in diameter so as to form respective shoulders or bosses 89, 91, 93, 95. The reduced diameter portions of the mounting posts 47, 49, 51, 53 are equal in diameter one with the other and are slightly smaller than the diameter of the apertures 83, 85 and have a suitably spaced apart relationship so that the holding component 45 may be removably and selectively supported by the first set of mounting posts 47, 49 or the second set of mounting posts 51, 53, i. e., the apertures 83, 85 respectively receiving the close fitted upper ends of the mounting posts 47, 49 when compound mitering the standard framing material 33, 33' (FIG. 6) and the apertures 83, 85 respectively receiving the close fitted upper ends of the mounting posts 51, 53 when compound mitering the reverse framing material 35, 35' (FIG. 8). The member 63 rests on the appropriate bosses 89, 91; 93, 95.

The framing material 33, 35 usually has many decorative surfaces or designs milled into the face portion thereof, e. g., curves, multi-planes, and/or ridges, all of which, when averaged together, form a major plane, which will herein be referred to for conveniently discussing these varied angular surfaces. In other words, the major plane of the framing material 33, 33' (FIG. 5) has a non-parallel relationship with the alignment surface 87 or an angle of approximately 30° is formed by an extension of the alignment surface 87 and the major plane of the framing material 33, 33'. It should be understood that the 30° relationship between an extension of the alignment surface 87 and the major plane of the framing material 33, 33' pertains to the particular framing material illustrated in FIG. 5, i. e., each particular designed framing material might have an angular relationship between its alignment surface and major plane unique for that particular design, e. g., 15°, 25°, 45°, etc.

When constructing a frame for a painting, or like, where compound mitering is desired, an important requirement is that the major plane of the framing material be precisely positioned when the compound mitering operation is accomplished, i. e., each of the four pieces making up the sides of the frame must be positioned precisely identical one with the other, a task not easily accomplished heretofore. Obviously, the slightest error in properly positioning the major plane of the framing material when forming the compound mitering thereof results in an obvious imperfect joining of the adjacent members.

The device 11 of the present invention assures that the major plane of the framing material 33, 35 is properly positioned consistently from one miter cutting to succeeding miter cuttings and the framing material 33, 35 is held rigid with respect to the severing means, e. g., the handsaw 17.

From the foregoing, it should be readily apparent that an important feature of the present invention is the adjustable jaws 71, 77; 73, 79 which respectively grip the dove-tailed base portion 43 of the framing material 33, 33' (FIG. 5) and/or 35, 35' (FIG. 11). In other words, assuming the member 63 to be stationary and the member 61 to be the movable member, manually rotating the wing bolt 65 forces the jaws 71, 73 towards the jaws 77, 79. This action not only forces the slanted sides of the dove-tailed base portion 33 to contiguously engage the elongated surfaces of the jaws but forces the alignment surfaces 87 to seat tightly or contiguously engage the elongated surfaces of the tongue portion 75. Accordingly, this assures consistency in correctly aligning the major planes of the framing material 33, 33' (FIG. 5) and/or 35, 35' (FIG. 11).

Another very important prerequisite to constructing a first quality frame, i. e., having perfect contiguous joining of the adjacent members at all four corners, is that opposite sides of the frame must be precisely equal one with the other. Obviously, any error in length between opposite sides results in objectionable misalignment of the adjacent members, i. e., a visible tapered crevice between the butt ends. The device 11 of the present invention obviates this problem by providing structure for compound mitering the opposite sides of a frame simultaneously, i. e., the framing material 33 (FIG. 5) conceivably might be the top member of a frame and the framing material 33' would then be the bottom member of a frame. In other words, two pieces of framing material 33, 33' are placed in the workpiece holding component 45 in a manner as previously described, and the holding component 45 is then placed on the first set of mounting posts 47, 49 (FIG. 6).

It should be obvious that the first set of mounting posts 47, 49 are arranged on the platform 13 so that when the workpiece holding component 45 is supported thereby, the framing material 33, 33' extends longitudinally beyond the plane of the blade 31 with the longitudinal axes thereof having a relationship with the plane of the blade 31 of precisely 45° and with the major plane of the framing material 33, 33' (FIG. 7) assuming a non-parallel relationship, or approximately 30°, with the platform 13.

Likewise, the second set of mounting posts 51, 53 are arranged on the platform 13 so that when the workpiece holding component 45 is supported thereby, the framing material 35, 35' (FIGS. 8 and 11) may extend longitudinally beyond the plane of the blade 31 with the longitudinal axes thereof having a relationship with the plane of the blade 31 of precisely 45° and the major plane of the framing material 35, 35' assuming a non-parallel relationship with the platform 13, the angular degree depending upon the unique design of the frame material, as above disclosed.

In other words, the two pieces of framing material 33, 33' or 35, 35' are simultaneously severed, i. e., one of the ends thereof being severed with one pass of the saw 17 and the workpiece holding component 45 removed from the appropriate set of holding posts 47, 49 or 51, 53 and the framing material 33, 33' or 35, 35' being rotated 180° through a vertical plane so as to present the opposite ends of the framing material 33, 33' or 35, 35' to the blade 31. It will be understood that if the arrangement is such that the plane of the mounting posts 51, 53 is parallel to the plane of the mounting posts 47, 49, then another set of pilot holes, not shown, corresponding to pilot holes 113, 115 will be necessary.

In order to avoid the objectionable procedure of repositioning the framing material 33, 33' or 35, 35' with respect to the holding component 45, it is preferred that a second holding component 45 be utilized, i. e., a first holding component 45 is positioned a predetermined distance from the ends of the framing material 33, 33' and/or 35, 35' and a second holding component 45 is positioned a predetermined distance along the length thereof depending upon the size of frame desired so that when the first mitered cut has been made, the first holding component may be removed from the appropriate mounting post 47, 49 and/or 51, 53 and the second holding component 45 is placed thereon. This can better be understood by referring to FIGS. 6 and 7 and assuming the framing material 33 to be adjacent the platform 13 or having a lower position and the framing material 33' having an upper position when the first mitering cut was made. The framing material 33 will later be in an upper position, and the framing material 33' will be in a lower position when making the second mitering cut.

The first set of mounting posts 47, 49 are used exclusively for compound mitering standard framing material 33, accordingly, the lip portion 39 thereof when supported by the holding component 45 is directed inwardly toward the mounting posts 47, 49. In this regard, the mounting posts 47, 49 have portions thereof cut away to provide clearance for the lip 39, thus forming a boss 97 on the post 47 and a boss 99 on the post 49, as best viewed in FIGS. 1 and 3. From the above disclosure, it should be obvious that the lip 39 of the lower framing material 33 assumes a juxtaposition with respect to the bosses 97, 99 when the first mitering cut is made, and following the end for end rotation of the framing material, the lip portion 39 of the framing material 33' has a juxtaposition with respect to the bosses 97, 99. Further, the mounting posts 51, 53 are used exclusively for supporting the holding component 45 when compound mitering reverse framing material 35, accordingly, the lip portion 41 thereof, being directed away from the posts 51, 53 does not interfere with the proper seating of the holding component 45.

The bosses 89, 91, 93, 95 preferably lie in a plane an equal distance above the platform 13 and parallel thereto so that when the holding component 45 is received by the appropriate set of mounting posts as previously described, the lower member 63 engages the appropriate bosses, thus assuring that the tongue portion 75 thereof is precisely parallel with the plane of the platform 13. This assures that the alignment surfaces of the framing material 33, 35 are parallel with the plane of the platform 13 and the major plane of the framing material 33, 35 is held so as to assume its unique angle with respect to the plane of the platform 13.

Determining the position along the framing material 33, 35 for placing the two holding components 45 is obvious to those skilled in the art, i. e., a frame is fabricated to accommodate a particular size painting 37 and the holding component 45 is positioned along the dove-tailed portion 43 so that the miter cut is made at the desired point. The width of the standard framing material 33 has no significance for determining the position of the components 45, however, the width of reverse framing material 35 will affect the positioning of the holding components 45 since the wider the framing material 35, the closer to the member 21 of the guide means 19 the lip portion 41 will be.

It will be understood that with the use of the present invention, it is easier to measure the framing for a particular size frame than was heretofore possible. Thus, referring first to the standard framing, when the holding component 45 is in place on mounting posts 47, 49, the distance from the side edge 45′ or 45″ to the place where the framing material will be cut off and which corresponds to the corner of the frame to be made, is a fixed predetermined distance, as for example 2 inches. All the person has to do is multiply this distance by 2 and subtract it from the width or length of the picture frame desired and this gives the distance apart that the two holding components should be placed. For the reverse framing material the above mentioned predetermined distance will depend upon the particular width of the framing material. Therefore, for convenience each piece of reverse framing material stock may be marked to indicate the predetermined distance for that particular piece.

The device 11 also includes drill guide means 101 hingedly attached to the platform 13 adjacent the plane of the blade 31 for guiding the longitudinal axis of a twist drill 103 (FIG. 7) at an angle of precisely 45° with respect to the longitudinal axes of the framing material 33, 33′ and/or 35, 35′ so that a hole 105 may be drilled into the severed butt ends of the framing material 33, 33′ and/or 35, 35′ by a drill motor 107 or the like for receiving a dowel pin 109. FIG. 9 of the drawings shows a corner section of a frame whereby two pieces of standard framing material 33 have been joined, i. e., the hole 105 being drilled in each piece and the dowel pin 109 inserted therein.

Referring to FIGS. 1, 2 and 7 of the drawings, wherein it may be seen that the drill guide means 101 comprises a block-like member 111 having a pair of parallel spaced apart pilot holes 113, 115 therein. The blocklike member 111, being formed from plastic, metal, wood or the like, is hingedly attached to the platform 13 by a hinge 117 having the one metal plate thereof fixedly attached to the platform 13 by a plurality of wood screws 119 and the articulating plate thereof fixedly attached to the blocklike member 111 by a plurality of wood screws 121, as viewed in FIG. 7. It should be understood that the pilot holes 113, 115 extend through the articulating metal plate of the hinge 117. In this regard, removable case-hardened sleeves (not shown) having an inner diameter slightly greater than the twist drill 103 preferably are inserted in the pilot holes 113, 115, in order to minimize wearing of the pilot holes 113, 115 and to insure a higher degree of accuracy in alignment of the holes 105.

The drill guide means 101 is phantomized in FIG. 7 for a normal position and is character-referenced by the numeral 101′ when articulated to a usable position. The blocklike member 25 serves the additional purpose of a mechanical stop for the guide means 101, i. e., the upper surface thereof contiguously engages the lowermost end of the blocklike member 111 so that the articulating plate of the hinge 117 comes to rest at a precisely vertical position with respect to the plane of the platform 13 as best viewed in FIG. 7. In other words, the longitudinal axes of the pilot holes 113, 115 are precisely perpendicular to the surfaces of the severed butt ends of the framing material 33, 35 when the guide means 101′ is positioned as depicted in FIG. 7. However, it should be pointed out that member 25 may be omitted without departing from the spirit and scope of the present invention, in which case the butt ends of the framing material 33, 35 will act as a stop for the guide means 101.

The pilot hole 113 preferably is arranged on the member 111 so as to be adjacent the dove-tailed base portion 43 of the lower framing material 33 and/or 35 and the pilot hole 115 is arranged on the member 111 so as to be adjacent the base portion 43 of the upper framing material 33′ and/or 35′, i. e., the base portion 43 for the framing material 33, 35 will be adjacent the pilot holes after miter cutting by using the first set of mounting posts 47, 49 or the second set of mounting posts 51, 53, as previously described. It will be understood that if the arrangement is such that the plane of the mounting posts 51, 53 is parallel to the plane of the mounting posts 47, 49, then another set of pilot holes, not shown, corresponding to pilot holes 113, 115 will be necessary.

If desired, instead of the mounting posts 51, 53 being aligned, as shown in FIG. 1, along a plane which is perpendicular to the plane along which mounting posts 47, 49 are aligned, the plane of the mounting posts 51, 53 may be parallel with the plane of the mounting posts 47, 49.

Referring now to FIGS. 12 and 13 of the drawings wherein it may be seen that a second embodiment of the device 11 of the present invention is in combination with a radial arm saw 123. In this embodiment, the members 21, 23 of the guide means 19 is removed from the platform 13, as best viewed in FIG. 13. It should be understood that the radial arm saw 123 includes the usual table or work surface 125, the usual track or guide means 127, the usual handle 129 and the usual prime mover 131 rotatably driving the usual circular planar blade 133. The user grasping the handle 129 moves the prime mover 131 and the blade 133 to and fro along the plane of the blade 133 and at an adjustable distance above the table 125 in the usual manner. The device 11, being void of the members 21, 23 of the guide means 19, is fixedly attached to the surface 125 in any well known manner, e. g., C clamps (not shown) or the like. The device 11 is arranged on the surface 125 so that the plane of the blade 133 is precisely at an angle of 45° with respect to the longitudinal axes of the framing material 33, 33′ and/or 35, 35′ and is an equal distance from the mounting post 49 as was the plane of the blade 31 (FIG. 6), the latter being necessary to retain correct positioning of the drill guide means 101.

The detailed disclosure pertaining to the principal embodiment of the device 11 pertains to the second embodiment with the only exception being that the hand saw 17 is replaced by the radial arm saw 123 having integral guide means 127 negating the members 21, 23 of the guide means 19. Accordingly, a detailed disclosure pertaining exclusively to the second embodiment would be redundant.

It should be understood that a swingably actuated chopping saw (not shown) may be used in combination with the device 11 of the present invention in lieu of the radial arm saw 123. Structure incorporating the device 11 with a chopping saw is obvious to those skilled in the art, accordingly, in the interest of brevity, a detailed disclosure of such will not herein be attempted.

From the foregoing, it should be readily appreciated that I have achieved several advantages in compound mitering and that practicing the present invention will most assuredly result in fabricating a frame of first class quality, regardless of the angular displacement of the major plane of the framing material with respect to the adjacent wall, i. e., from which the frame is intended to hang.

Although the invention has been described and illustrated with respect to preferred embodiments thereof, it is not to be so limited since changes and modifications may be made therein which are within the full intended scope of the invention.

I claim:

1. A device for compound mitering the ends of framing material comprising a horizontally disposed platform, planar severing means for mechanically severing the framing material, severing guide means having a fixed relationship with said platform for guidingly constraining the plane of said severing means perpendicular to the plane of said platform, workpiece holding means for clampingly holding the framing material, means fixedly attached to said platform for removably mounting said workpiece holding means thereon so as to hold the framing material a distance above said platform at a predetermined relationship thereto, said mounting means being arranged on said platform so that when said workpiece holding means is supported thereby the framing material may extend longitudinally beyond the plane of said severing means with the longitudinal axis thereof forming an angle of precisely 45° with the plane of said severing means and with the major plane of the framing material assuming a non-parallel relationship with said platform, and drill guide means attached to said platform for guiding a drill at a predetermined angle with respect to the framing material so that at least one precisely aligned hole may be drilled into the severed butt end of the framing material for receiving a reinforcement dowel pin therein, said drill guide means being arranged on said platform so that said drill guide means can be moved to a position adjacent said workpiece holding means and adjoining the severed butt end of the framing material.

2. The device of claim 1 in which said mounting means includes a first and second mounting means, said first mounting means for supporting said workpiece holding means when mitering standard framing material, said second mounting means for supporting said work holding means when mitering reverse framing material.

3. The device of claim 1 in which said workpiece holding means includes an upwardly directed holding clamp for contiguously engaging a first workpiece, and a downwardly directed holding clamp for contiguously engaging a second workpiece so that two workpieces may be held rigid one with the other while the respective ends thereof are severed simultaneously by said severing means so as to fabricate two pieces of framing material having a length precisely equal one with the other.

4. The device of claim 1 in which said planar severing means comprises a radial arm power saw.

5. The device of claim 3 in which said upwardly and said downwardly directed holding clamps includes elongated female dove-tails for contiguously engaging along the length thereof the base portion of framing material having a complementary male dove-tail cross section.

6. The device of claim 3 in which said drill guide means comprises a block-like member having at least a pair of pilot holes therethrough for removably receiving a drill, and means hingedly mounting said block-like member to said platform for movement from and to a position adjacent the ends of severed pieces of framing material held by said holding means.

7. In a compound mitering device for use with workpieces having dovetail base portions, a workpiece holding component comprising a pair of members movable relative to one another, one of said members including a first pair of inwardly tapered jaws disposed respectively on the upper and lower sides of said workpiece holding component, the other of said members including a second pair of inwardly tapered jaws opposite said first pair of jaws to establish therewith a holding clamp directed in a first direction for contiguously engaging a first dovetail base portion of a first workpiece and a holding clamp directed in the opposite direction for contiguously engaging a second dovetail base portion of a second workpiece so that two workpieces may be held rigid one with the other for the severing thereof.

8. The structure of claim 7 which includes means for removably and selectively supporting said workpiece holding component in a first position with one of said holding clamps directed upwardly and the other of said holding clamps directed downwardly or in a second position with said other of said holding clamps directed upwardly and said one of said holding clamps directed downwardly.

9. In a compound mitering device for use with a severing means and for simultaneous use with two workpieces of framing material having male dovetail base portions, a horizontally disposed platform, severing guide means having a fixed relationship with said platform for guiding the severing means perpendicular to the plane of said platform, workpiece holding means for clampingly holding the framing material, and means fixedly attached to said platform for removably mounting said workpiece holding means thereon; said workpiece holding means comprising an upwardly directed holding clamp including elongated female dovetail means for contiguously engaging along the length thereof the male dovetail base portion of a first workpiece, and a downwardly directed holding clamp including elongated female dovetail means for contiguously engaging along the length thereof the male dovetail base portion of a second workpiece.

* * * * *